United States Patent [19]

Ouchi et al.

[11] Patent Number: 5,369,870
[45] Date of Patent: Dec. 6, 1994

[54] METHOD FOR DECIDING PROCEDURE OF MACHINING

[75] Inventors: Sadami Ouchi; Satoru Fujita, both of Hyogo, Japan

[73] Assignee: Mitsubishi Denki Kabushiki Kaisha, Tokyo, Japan

[21] Appl. No.: 217,851

[22] Filed: Mar. 25, 1994

Related U.S. Application Data

[63] Continuation of Ser. No. 704,514, May 23, 1991, abandoned.

[30] Foreign Application Priority Data

May 24, 1990 [JP] Japan .................... 2-136671
Nov. 2, 1990 [JP] Japan .................... 2-298698

[51] Int. Cl.$^5$ .............................. B23P 13/04
[52] U.S. Cl. .............................. 29/558; 29/557; 364/474.21
[58] Field of Search .............................. 29/557, 558; 364/474.21

[56] References Cited

U.S. PATENT DOCUMENTS

| | | | |
|---|---|---|---|
| 4,519,125 | 5/1985 | Colonius et al. | 29/557 |
| 4,530,046 | 7/1985 | Munekata et al. | 364/474.21 |
| 4,667,294 | 5/1987 | Shima et al. | 364/474.21 |
| 4,680,719 | 7/1987 | Kishi et al. | 364/474.21 |
| 4,739,488 | 4/1988 | Asakura | 364/474.21 |
| 4,750,105 | 6/1988 | Ohkawa et al. | 364/474.21 |
| 4,823,255 | 4/1989 | Tanaka et al. | 364/474.21 |
| 4,888,863 | 12/1989 | Cox et al. | 29/557 |

OTHER PUBLICATIONS

P. C. Subbarao, "Feature Based Process Planning System for Machined Components Using Expert Systems Technology", Symposium Manufacturing System Design Integrated Control, 1988.

*Primary Examiner*—Mark Rosenbaum
*Assistant Examiner*—David P. Bryant
*Attorney, Agent, or Firm*—Sughrue, Mion, Zinn, Macpeak & Seas

[57] ABSTRACT

A method of automatically deciding procedure for machining parts, in which the parts configuration data is input. The input parts configuration data is compared with a plurality of predetermined ordinary parts data which correspond to a plurality of predetermined patterns of the machining processes, respectively. One of the predetermined patterns is determined as a design of the machining process corresponding to the input parts configuration data. Machine tools and machining specifications for each process of the determined patterns are determined in accordance with the input parts configuration data.

8 Claims, 4 Drawing Sheets

| CONFIGURATION | | SURFACE, EDGE LINE, APEX |
|---|---|---|
| MACHINING CONFIGURATION ELEMENT | REGION I | OPEN FACE, FACE |
| | REGION II | POCKET, THROUGH POCKET |
| | OTHERS | GROOVE, STEP, STOPPING GROOVE, HOLE, TAP HOLE |
| PRECISION | LOCAL | SURFACE ROUGHNESS, FLATNESS, CYLINDRICITY |
| | GLOBAL | TOLERANCE, PARALLEL PRECISION, RECTANGULAR PRECISION, AXIAL PRECISION, POSITIONING PRECISION |

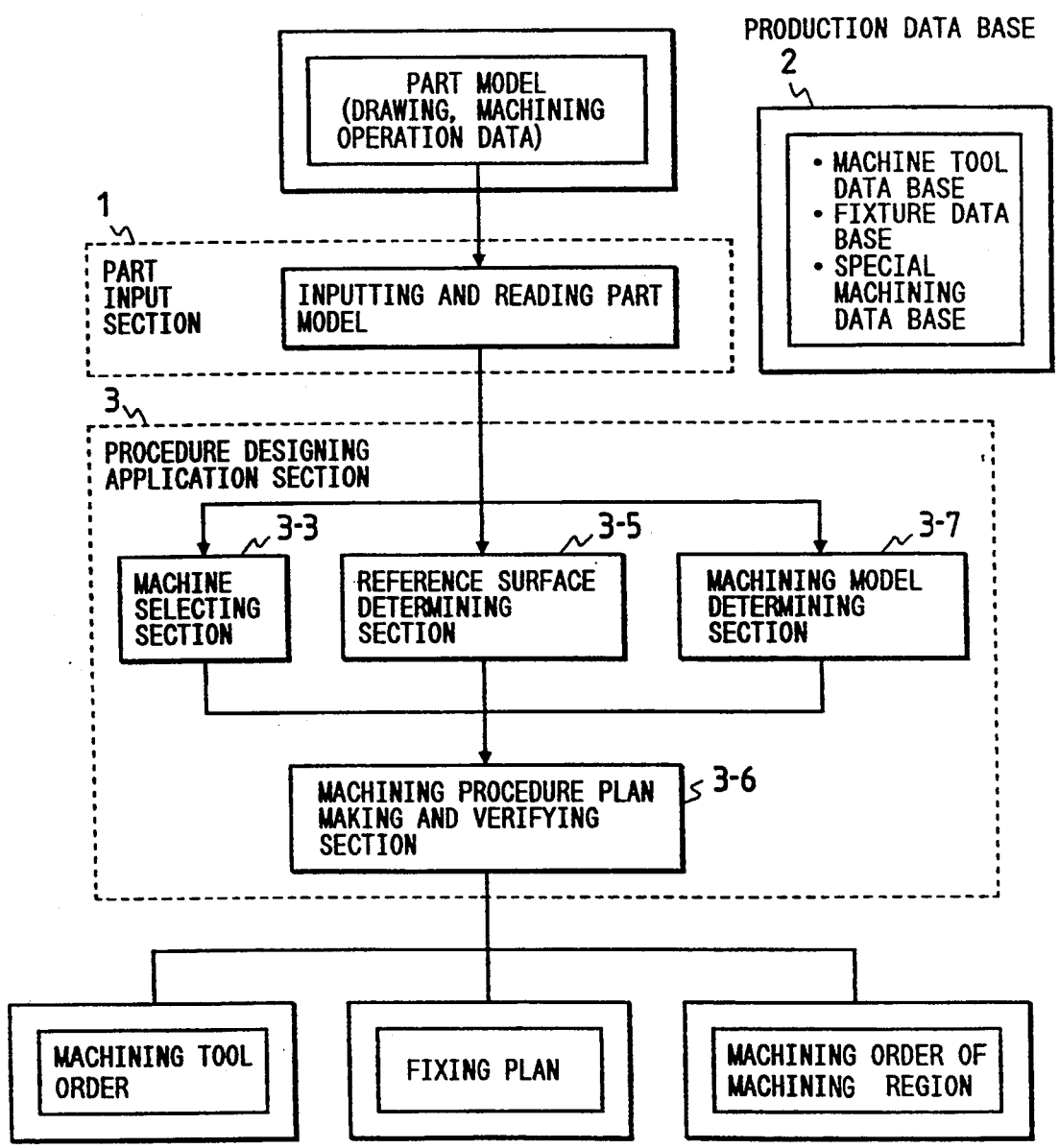

METHOD FOR DECIDING PROCEDURE OF MACHINING

This is a continuation of application No. 07/704,514 filed May 23, 1991 now abandoned.

BACKGROUND OF THE INVENTION

This invention relates to a method and processing system of automatically determining the machining procedure for machining parts.

FIG. 5 is a block diagram outlining a conventional method for designing the procedure for machining parts which has been disclosed, for instance, by Japanese Patent Application Laid-Open No. Hei. 2-015949. In FIG. 5, reference numeral 1 designates an input section of parts for inputting part configurations. The term "parts configuration" as used herein is intended to mean data relating to the configuration and precision of parts to be machined including drawing data and machining operation data. Further, reference numeral 2 designates a production data base section including data relating to machine tools, cutting tools, special machining operations, etc.; reference numeral 3 designates an application section for designing a machining procedure which, in accordance with the parts configuration and the production data base, determines a machining procedure plan; 3-3, a machine selecting section for determining a machine tool to be used from both the rough configuration of parts to be machined and the data base of machine tools selected; 3-5, a reference surface determining section for determining a reference surface from the parts configuration by using the knowledge of a machining reference surface; 3-7, a machining mode determining section for determining a machining mode for a region to be machined from the parts configuration given and the data base of machine tools selected; and 3-6, a machining procedure plan making and verifying section which determines a machining procedure plan in accordance with the data which have been determined through the above-described operations, and verifies the machining procedure plan.

The data of parts to be machined or parts configurations are inputted into the computer by the parts input section. The term "parts configuration" will be defined in more detail; that is, it includes part configuration data, which includes dimensional tolerances and machining technical data consisting of machining configuration elements and precision of the machine tool. A machine tool to be used is selected in accordance with the given machine tool data base and parts configuration. Next, in accordance with tolerance data specified for the parts and the precision of the machine tool thus selected, a machining mode is determined for machining a region with the specified tolerance. A machining reference surface for the table of the machine tool is determined from the parts configuration so that it is sufficiently large in area and is machined finely. A tolerance reference surface which is used as a reference for positioning the parts and a reference for centering the parts is determined, for every machining reference surface, in accordance with the machining knowledge which ensures machining precision and allows the arrangement of fixtures.

At this stage, a plurality of machining postures, i.e. orientations of the machining blank may be obtained. In this case, a plurality of machining procedure plans may be made in accordance with the results of the above-described operations. For each of the machining procedure plans, it is detected whether or not the precision specified for the parts by the parts configuration can be attained; that is, verification of the procedure plan is carried out.

The conventional method of designing a machining procedure has the following disadvantages. Ordinary designing procedures for machining parts are determined in accordance with the experience or know-how of a production designer. Therefore, if the production designer makes a mistake in designing the procedure, then the resultant process for machining may be flawed. In general, a machining procedure plan is determined from each machining process, the characteristics of a machine tool and fixtures to be used, the dimensional precision specified for parts to be machined, and machining know-how of the production designer. However, the conventional method is provided for designing a machining procedure for only one machine tool; that is, in the case where a plurality of machine tools are used, the conventional methods cannot determine machining processes and the order of use of the machine tools, and fixtures and blanks to be used in each of the processes.

On the other hand, the provision of a compound machine tool such as a horizontal machining center or turning center makes it possible to achieve several machining operations of a conventional machine tool continuously or in one action. However, in some working sites, the flexibility of the compound machine tool is not sufficiently utilized. Furthermore, in some working sites, in addition to a compound machine tool, a general purpose machine tool which is to be operated by the operator is provided. Hence, it is considerably difficult to design a machining procedure for a working site which has a compound machine tool with a high degree of freedom; that is, in this case, the conventional method of the designing procedure which depends on the designer's experience and know-how cannot be utilized.

SUMMARY OF THE INVENTION

Accordingly, an object of this invention is to eliminate the above-described difficulties accompanying a conventional method for determining a machining procedure. More specifically, an object of the invention is to provide a method of determining processes for machining parts in which a machining procedure can be designed depending on the particulars of a working site and a machine tool operating method, and a machining procedure plan is automatically made in accordance with the features of the determined processes depending on the working site, machining postures, and parts configurations, and the machining procedure plan is verified by verifying the machinability of the parts under these conditions.

In a method of designing a procedure for machining parts according to the invention, with respect to a plurality of ordinary part configurations in which the flows of necessary machining procedures are arranged in the form of patterns in advance, a given part configuration is compared with the ordinary part configurations. As the result, one of the patterns of machining procedures associated with one of the ordinary part configuration is determined as a pattern for the given part configurations, and machine tools and machining specifications usable for the processes are determined from a data base.

In determining the order of processes, which is one of the specific features of the invention, the nature of machining processes and the use of machine tools of the particular working site taken into consideration and the processes are arranged in the form of machining procedure patterns with respect to a plurality of ordinary parts and the machining procedure patterns are stored as ordinary part configurations. A given part configuration is compared with the ordinary part configuration, the flow of machining procedures is determined for the given part configuration based on the stored patterns. In selecting machine tools, parts precision data such as tolerances processed by arithmetic means machine tools and cutting tools employable for the processes are determined from the data base. At the same time, it is determined whether or not a machining region can be machined with the given machine tool. When it is determined that the machine tool is not applicable to the region, then a non-cutting operation is employed for the region; that is, for instance an electric discharge machine is employed therefor.

The dimensions of the parts and the blanks data base are processed with arithmetic means, to automatically select a suitable machining blank. Referring to the dimensions of the blank thus selected and the dimensions of the part specified by the part configuration, the volume which to be removed therefrom by machining is obtained. The volume thus obtained and the dimensional tolerances data of the part configuration are processed with arithmetic means, to determine whether or not heat treatment is necessary for the part. When it is determined that heat treatment should be applied to the part, then the order of processes is modified so that heat treatment is carried out at a suitable opportunity. Furthermore, the machining posture is determined with reference to the determined order of processes and the selected machine tools, and it is determined whether or not the part can be installed on the machine tool, so that a process for determining the fixtures is processed with arithmetic means.

BRIEF DESCRIPTION OF THE DRAWINGS

FIG. 5 is a block diagram outlining a conventional procedure designing method of machining.

DETAILED DESCRIPTION OF THE PREFERRED EMBODIMENT

One preferred embodiment of this invention, a method of designing a procedure for machining parts, will be described with reference to the accompanying drawings.

Figure 1:
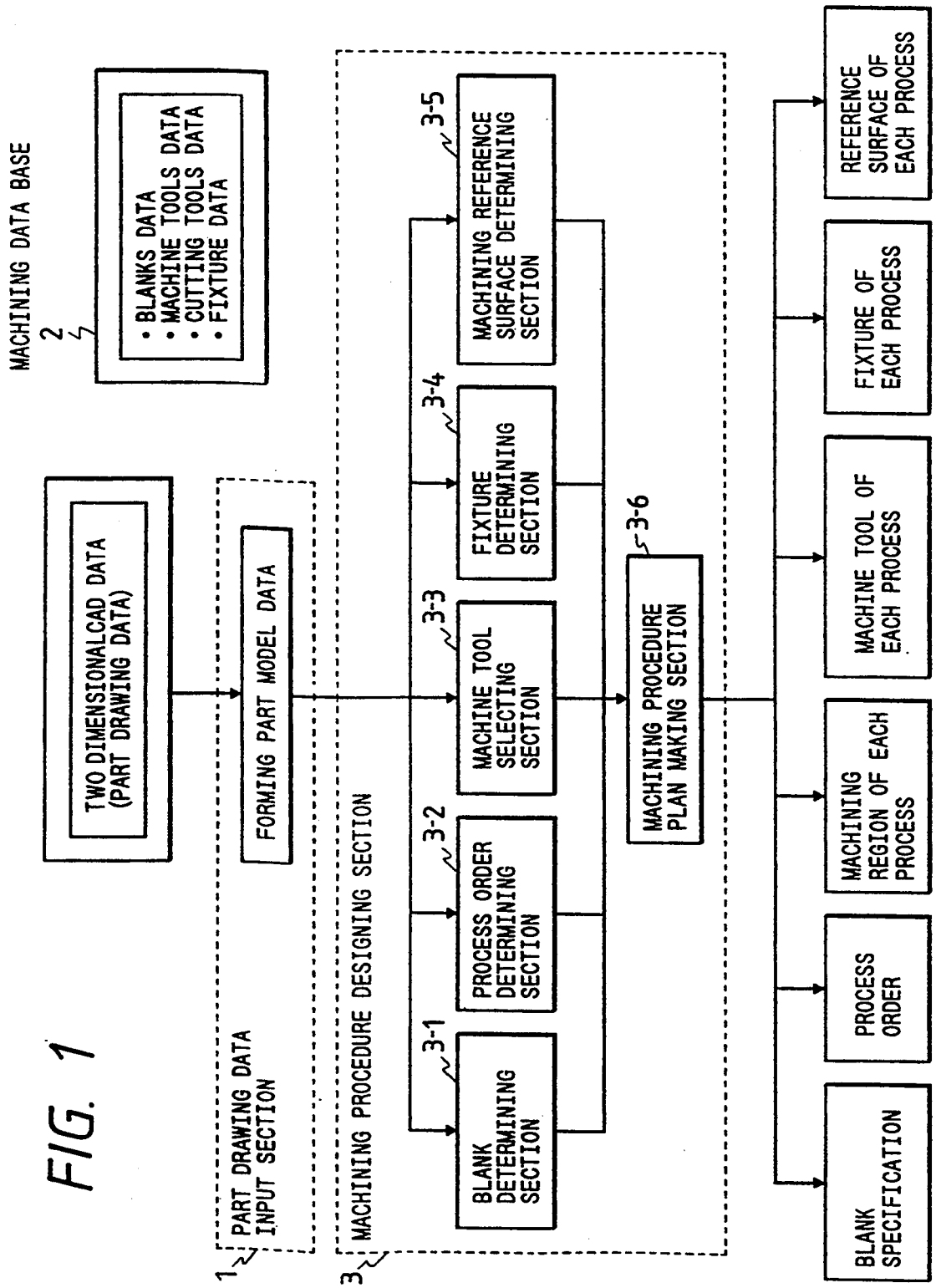
FIG. 1 is a block diagram outlining a procedure designing method of machining which constitutes one embodiment of the invention.
Figures 3, 4:
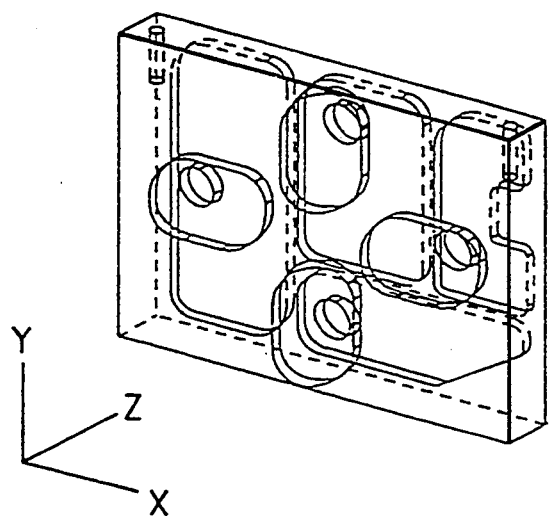
FIG. 3 is an explanatory diagram showing an example of part configuration employed in the method of the invention.
FIG. 4 is a perspective view showing an example of a plate-shaped part which is processed in accordance with the method of the invention.

In FIG. 1, reference numeral 1 designates parts drawing data input section for forming part configurations as shown in FIG. 3 for instance. The configuration includes data on the configuration of the parts to be machined, and machining technical data. The machining technical data includes precision data consisting of surface roughness and tolerances specified, and machining configuration elements such as faces, pockets and holes indicating machining surfaces and the features of the configurations of the latter. Further in FIG. 1, reference numeral 2 designates machining data bases containing data with respect to blanks, machine tools, and tools, with a control section; reference numeral 3 designates a machining procedure designing section for processing the knowledge on the procedure design of a machine tool in accordance with a given part configuration and the machining data base, to make a procedure plan. The machining procedure designing section 3 includes; a blank determining section 3-1 for automatically determining a blank to be used from the rough configuration of the parts to be machined and a given blank data base; a process order determining section 3-2 for determining processes and the order of the processes in accordance with the given part configuration and the data base of the blank determined; a machine tool selecting section 3-3 for selecting a machine tool for each process in accordance with the given part configuration and machine tool data base, and the order of processes determined; a fixture determining section 3-4 for determining a fixture and a machining posture for each process in accordance with the given part configuration, machine tool data base and fixture data base, and the order of processes determined; a machining reference surface determining section 3-5 for determining a machining reference surface for each process in accordance with the given part configuration and machine tool data base, the fixture thus determined, and the order of processes determined; and a machining procedure plan making section 3-6 for making a machining procedure plan in accordance with the data which have been determined through the above-described operations.

In part drawing data input section 1, the parts drawing received from a higher two-dimensional CAD system is processed, so that the part configuration, which is data on the parts to be machined, is inputted into a computer. As shown in FIG. 3, the configuration includes configuration data, and machining technical data consisting of dimensional tolerances and machining configuration elements i.e. machining steps to be performed on the blank.

Figure 2:
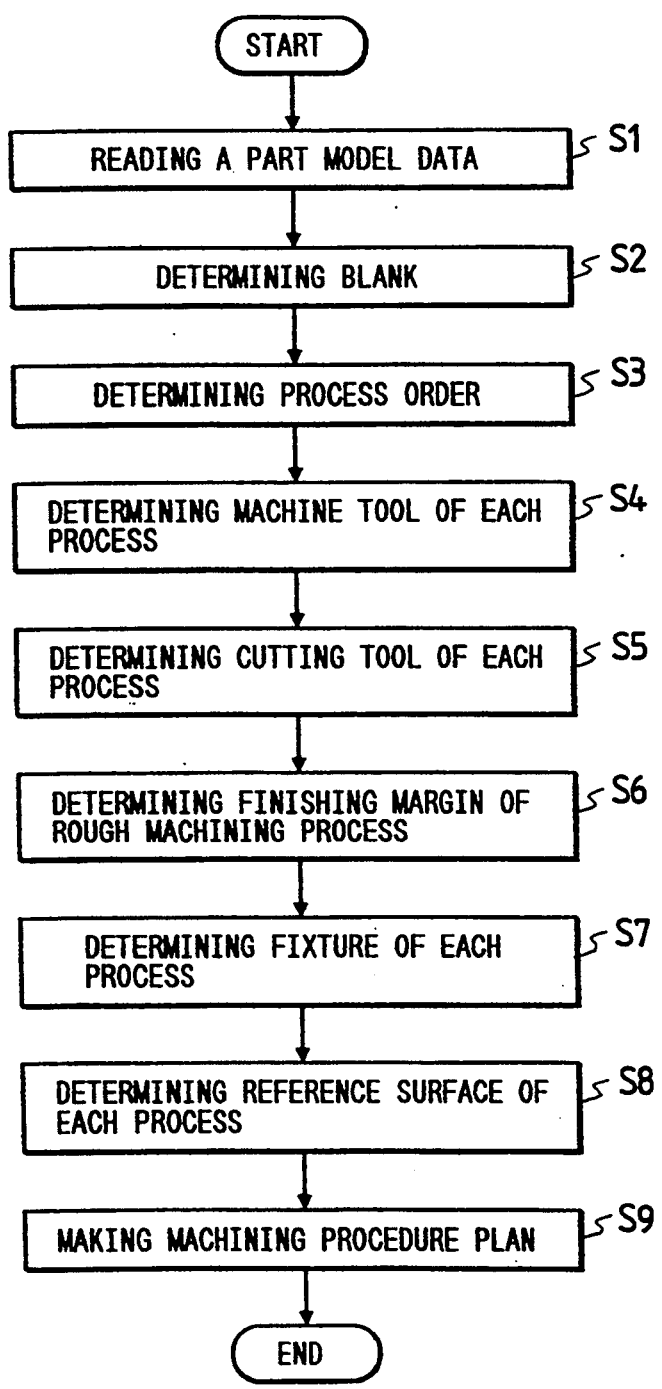
FIG. 2 is a flow chart for a description of the flow of operations in the procedure designing method of the invention.

The method of the invention will be described with reference to FIG. 2.

In Step S1, the given part configuration is read. In Step S2, a suitable blank is automatically selected from a given blank data base with dimensions obtained by adding machining margins to the dimensions of the rough configurations of the parts as determined by the part configuration as the most suitable dimensions. In Step S3, the order of machining processes is determined as follows: a plurality of predetermined ordinary part configurations are determined, in accordance with the nature of processes such as a reference surface machining process, a rough machining process and a finish machining process and the method of using machine tools at the particular working site, and including data related to the the flows of necessary processes arranged in the form of patterns of machine processes. And the part configuration is given in Step S1 compared with the above-described ordinary part configurations to select, one of the aforementioned patterns of machine processes which most closely conforms to the given part configuration, so that the order of processes for forming the desired part is determined. In Step S4, machine tools to be used respectively for each of the processes are determined. In this connection, process patterns will be described with reference to FIG. 4 showing a plate-shaped part which is to be machined. If it is assumed that, in a design drawing, the front view shows the front surface of the part, the rear view shows the rear surface thereof, and the other views show the side surfaces thereof, then the features of necessary processes, the order of processes, and machine tools therefor can be determined as follows:

(1) Outline rough machining—In this case, machine tools such as a vertical milling machine and a horizontal milling machine may be employed.

(2) Front and rear surfaces rough machining—In this case, machine tools such as a machining center and a vertical drilling machine may be employed.

(3) Side surfaces rough machining—In this case, machine tools such as a machining center and a vertical milling machine can be used.

(4) Outline finish machining—In this case, machine tools such as a vertical milling machine and a jig boring machine can be used.

(5) Front and rear surfaces finish machining—In this case, machine tools such as a machining center and a vertical drilling machining can be employed.

(6) Side surfaces finish machining—In this case, machine tools such as a machining center, and a vertical milling machine can be used.

Owing to the introduction of the process patterns in this manner, the most suitable order of processes and machining regions and machine tools for the processes can be determined from the machine tool data base including the table sizes of machines and the upper limits in static and dynamic precision of the same, the dimensions of a rough configuration of the parts inputted, machining configuration elements, and tolerances specified. If a machining region cannot be machined with a machine tool because it is intricate in configuration or small in area (or narrow), a non-cutting operation is employed; that is, for instance an electric discharge machine is employed.

In the case where it is determined while the part is being machined into the final configuration that the specified precision cannot be attained because of the strain of the parts being machine, the order of processes is modified so that a heat treatment process (annealing) is carried out at a suitable opportunity. In the case of the plate-shaped part, the addition of the heat treatment process is determined from the determined blank configuration, the volume removed from the blank by machining, and the tolerances specified for the part. Depending on a necessity of the heat treatment which can be estimated, the heat treatment is carried out as follows:

(1) The heat treatment is carried out before a rough machining operation.

(2) The heat treatment is carried out after a rough machining operation.

(3) The heat treatment is carried out before and after a rough machining.

(4) No heat treatment is carried out.

Next, in Step S5, in accordance with the data on the machining configuration elements of the part and the tolerance specified therefor, a tool is selected the effective edge length of which is well-balanced with a machining depth in the machining region.

In a rough machining operation, the most suitable finishing margin of each machining region is determined from the data on the machining configuration elements of the part, the tolerance specified therefor, the order of processes determined, and the tool thus selected (Step S6). That is, in Step S6, machining knowledge is fully utilized in such a manner that, for instance, in the case where the machining configuration element is a pocket, no heat treatment process is included in the series of processes, and the precision is relatively low, then the finishing margin is set to 0.1 mm.

Fixtures for processes are determined as follows: First, the machining posture i.e. position of the blanks in each process is estimated according to the machining region to be handled and the direction in which the tool of the machine tool is to be moved. Then, a fixture is selected with reference to the fixtures data base so that, with the machining posture held, the fixture can be installed in a manner that well-balanced in dimension with the intermediate blank configuration (Step S7).

There are two kinds of machining reference surfaces: the first is the surface which, in a mounting operation with a mounting tool, is employed as a mounting reference surface, and the second is the surface which is employed as a reference surface for positioning the parts to be machined. In accordance with the data of the part configuration and the data on a method of mounting the fixture thus selected in the production database, one planer surface which is sufficiently large in area, and other planer surfaces which are perpendicular to the former, respectively, are determined as machining reference surfaces in a process (Step S8).

Thus, with respect to the given part configuration, the blank, the order of processes, and the machine tools, the cutting tools, the fixtures and the finishing margins in rough machining which are to De employed in the processes, and the machining postures and the machining reference surfaces for the process have been automatically based on the ordinary part configuration determined. In accordance with the above-described results of determination, in Step S9, a machining procedure plan is made, and the data of the determined blank specification, the order of processes, and the machining regions, machine tools, fixtures and machining reference surfaces which are selected for the processes, are respectively outputted.

The embodiment of the invention has been described with reference to the machining of plate-shaped parts; however, the invention is not limited thereto. That is, the method of the invention is applicable to the machining of box-shaped parts and bar-shaped parts as well as plate-shaped parts. More specifically, the method of the invention can be applied to the machining of those parts by utilization of the knowledge of the machinability of the given part and the selection of fixtures and machining reference surfaces is utilized with the nature of each process and the use of machine tools at a working site taken into consideration through the predetermined ordinary part configurations.

In the above-described embodiment, the processes are arranged in the form of patterns, and stored in predetermined ordinary part configurations with the nature of each process and the use of machine tools at a particular working site analyzed. However, in the case where, as in case of the plate-shaped parts having front, rear and side surfaces, the machining posture can be determined with ease from the relative position of a machining region, the method of using fixtures at the working site may be arranged in the same manner.

As was described above, in the method of the invention, the machining procedure plan is made as follows: With the nature of machining processes and the use of machine tools at a particular working site analyzed, the machining processes are arranged in the form of machining patterns and stored in connection with ordinary part configuration, and with the given part configuration is compared with the ordinary part configurations to determine, the order of processes, and machine tools for the processes are determined from input data of a machining data base. Thus, the procedure designing with the contents of machining processes and the use of machine tools taken into consideration depending on the know-how particular at working sites can be automatically achieved according to the invention. Thus, an advanced machining procedure can be realized according to the invention which is highly effected with a system of producing small numbers of various items.

In those figures, like parts are designated by like reference numerals or characters.

What is claimed is:

1. A method for automatically determining a procedure to be used for the machining of a workpiece to produce a part, the method comprising the steps of:
   (a) pre-setting in a memory a plurality of ordinary part configurations which include dimensional precision and corresponding patterns of machining processes to be used to machine a workpiece to produce such ordinary parts, said patterns being a sequence of machining operations necessary to create a corresponding ordinary part;
   (b) inputting at least the part configuration data of the part that is to be produced;
   (c) selecting one of said ordinary part configurations on the basis of the data input in step (b) so that a sequence of machining processes to be used in producing the part is determined based on a corresponding one of said patterns; and
   (d) determining the machine elements and machining specifications for each process of the pattern selected in step (c) for machining the workpiece to produce a part corresponding to the input part configuration data.

2. A method for determining a procedure according to claim 1 in which said specifications comprise orientations of a workpiece during machining and machining reference surfaces that are to be used in machining the part.

3. A method for determining a procedure according to claim 1 in which said machine elements comprise machining blanks, machine tools and fixtures.

4. A method for determining a procedure according to claim 1 in which the data of said one ordinary part configuration selected in said step (c) comprises dimensions of the configuration of the corresponding ordinary part, machining configuration elements, and dimensional precision of the corresponding ordinary part.

5. A method for determining a procedure according to claim 4, wherein said selecting step (c) comprises the steps of automatically determining a machining blank, which is a machining base material, corresponding to the configuration of the part to be produced based on said ordinary part configurations; calculating a volume removed from the blank thus determined based on the difference between the configuration of the blank and the said dimensions of configuration of the part to be produced; and adding a heat treatment process to said sequence of machining processes on the basis of the calculated volume and said precision data.

6. A method of automatically determining a procedure used by at least one machine tool to machine one of a plurality of blanks to produce a part, the procedure being made up of a plurality of processes to be performed by said at least one machine tool, the method comprising the steps of:
   (a) inputting part configuration data representative of the attributes and features of the part;
   (b) automatically determining which one of said plurality of blanks is to be used by said at least one machine tool based on said part configuration data;
   (c) automatically determining a plurality of processes that are to be performed by said at least one machine tool based on said part configuration data and said one blank thus determined; and
   (d) automatically generating a procedure made up of the plurality of processes thus determined, wherein said procedure is used by said at least one machine tool to machine said one blank determined in step (b) so as to produce a part having the attributes and features represented by said part configuration data.

7. The method of automatically determining a procedure as recited in claim 6, further comprising the steps of:
   automatically determining the orientation of said one blank determined in step (b) relative to said at least one machine tool based on said part configuration data; and
   selecting fixtures which are to be used with said at least one machine tool to maintain said one blank in a position for machining by said at least one machine tool.

8. The method of automatically determining a procedure as recited in claim 6, wherein said determining step (c) further comprises the steps of:
   verifying if each of said plurality of processes determined in step (c) can be performed on said one blank determined in step (b) by said at least one machine tool; and
   selecting a substitute process for each process that cannot be thus verified.

* * * * *